(12) United States Patent
Woods et al.

(10) Patent No.: US 6,229,649 B1
(45) Date of Patent: May 8, 2001

(54) PSEUDO DECONVOLUTION METHOD OF RECOVERING A DISTORTED OPTICAL IMAGE

(75) Inventors: Charles L. Woods, Stow, MA (US); Jehad Khoury, Concord, NH (US); Jack Fu, Brighton, MA (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 08/319,143

(22) Filed: Oct. 4, 1994

(51) Int. Cl.$^7$ .................................................. G02B 27/46
(52) U.S. Cl. ..................... 359/560; 359/559; 359/900; 382/254
(58) Field of Search .................. 359/29, 559, 560, 359/16, 107, 564, 558, 900; 382/254, 255, 260, 279, 280

(56) References Cited

U.S. PATENT DOCUMENTS

| | | | |
|---|---|---|---|
| 4,187,000 | * | 2/1980 | Constant ............................... 359/559 |
| 4,976,520 | * | 12/1990 | Brandstetter et al. ................ 359/107 |
| 5,111,515 | * | 5/1992 | Javidi .................................... 359/559 |
| 5,426,521 | * | 6/1995 | Chen et al. ........................... 359/559 |

OTHER PUBLICATIONS

A. S. Marathan, "Realization of Complex Spatial Filters with Polarized Light", J. Opt. Soc. Amer., vol. 59, No. 6, pp. 748–752, Jun. 1969.*

J. L. Horner, "Optical Spatial Filtering with the Least Mean–Square–Error Filter", J. Opt. Soc. Amer., vol. 59, No. 5, pp. 553–558, May 1969.*

P. M. Hirsch, et al., "Coherent Complex Spatial Filter" IBM Technical Disclosure Bulletin, vol. 13, No. 7, Dec. 1970.*

Bahaa E. A. Saleh, "Wiener Restoration of Defocused Partially Coherent Images," *Applied Optics*, vol. 19, No. 21, Nov. 1, 1980, pp. 3646–3650.*

S. L. Zhuang, et al., "Smeared–Photographic–Image Deblurring Utilizing White–Light–Processing Technique", *Optics Letters*, vol. 6, No. 2, Feb. 1981, pp. 102–104.*

W. J. Dallas, et al., "Simplified Production of Spatial Inverse Filters," *Optics Letters*, vol. 3, No. 6, Dec. 1978, pp. 247–249.*

D. Casasent, et al., "Determinations of Linear and Nonlinear Phase Distributions", SPIE vol. 126, Clever Optics, San Diego, CA, Aug. 25–26, 1977, pp. 32–38.*

* cited by examiner

*Primary Examiner*—Thong Nguyen
*Assistant Examiner*—J. Juba, Jr.
(74) *Attorney, Agent, or Firm*—Robert L. Nathans; William G. Auton

(57) ABSTRACT

A first lens produces a Fourier transform of the wavefront distorted optical image at the Fourier transform plane. A phase encoded filter is positioned at the transform plane and a second filter is tandemly positioned with respect to the first filter, the second filter having a transmittance which is statistically similar to the reciprocal spatial frequency spectrum of the Fourier transform of the distortion function, to in turn produce an intermediate signal at the transform plane, which is now Fourier transformed by a second lens to recover the optical image having a substantially reduced degree of distortion.

7 Claims, 1 Drawing Sheet

PSEUDO DECONVOLUTION METHOD OF RECOVERING A DISTORTED OPTICAL IMAGE

STATEMENT OF GOVERNMENT INTEREST

The invention described herein may be manufactured and used by or for the Government for governmental purposes without the payment of any royalty thereon.

BACKGROUND OF THE INVENTION

The invention relates to the field of the recovery of distorted optical images.

Restorations of images from turbulence aberration and blur are important problems in signal processing. While many computer algorithms have been developed for these purposes, these algorithms were beneficial in solving problems with quantified and non-quantified sources of distortion. These algorithms are very difficult to implement optically and their execution is not real time. Therefore, optics remains confined to solve distortion problems where the distortions is well quantified and measured. The origins of these distortion can be the following: misfocussing, motion, lens aberration and distortion through transmission in thin aberrating media. It is well-known that in order to recover those types of distorted signals, one is required to performed deconvolution or exact phase compensation. Unfortunately, up to now, there is no optical system which can be used to solve problems with unknown distortion as in the case of blind deconvolution. In digital processing, deconvolution of the blurred image by the blurring function is a straightforward problem. However, optically this is an extremely difficult task due to the difficulties in the fabrication process of the inverse filter. Therefore, in accordance with the present invention, we provide a pseudo deconvolution technique wherein we replace the exact phase of the inverse filter (the Fourier transform of the blurring function) by its phase coded filter and we replace the amplitude of the inverse filter by its amplitude statistical distribution.

Recovery of distorted images, which have passed through thin or thick aberrating media, has been demonstrated in many scientific papers. The majority of the techniques for recovering the signal from a thick aberrating medium rely on double-pass methods using phase conjugate mirrors which means that they will have very limited application. There were also some attempts for one-way image transmission through thin aberrating media.

While some of these techniques were purely based on phase conjugate means, some others were based on the combination of the phase conjugate techniques and the opto-electronics devices or purely opto-electronics. Generally, the performance of aberration correction using phase conjugate means was poor for two main reasons. The first reason is related to the nature of writing efficient gratings in real time holographic media. Because the receiving channel is always at an angle with the casting channel, the projection from the casting channel to the receiving channel is always accompanied by losses in the resolution. The second reason is related to the weak intensity of the distorted signals. It is well-known that due to the current limitation on the available materials, phase conjugators are slow or don't respond to low light intensities.

Opto-electronics techniques also have their limitations. These techniques usually require spatial light modulators that can address phase information. Unfortunately, there are very few such spatial light modulators existing today. In addition, they are expensive. Therefore, we propose and evaluate several simple signal recovery techniques which are based on phase and/or amplitude coding filters. These techniques can be implemented by all of the available spatial light modulators (binary phase, binary amplitude, ternary amplitude or phase, continuous amplitude or phase). Since the method of the present invention does not use the exact phase information of the distortion function, our results are always accompanied by some degree of additive noise. The additive noise in the recovered image is dependent on the specific recovery coding techniques used and how they are implemented.

BRIEF SUMMARY OF THE INVENTION

The invention involves producing a Fourier transform of the wavefront distorted optical image at a Fourier transform plane, placing a first phase coded filter at the transform plane, placing a second amplitude encoded filter at the transform plane in a tandem relationship with the first filter, the second filter having a transmittance function which is statistically similar to the reciprocal spatial frequency spectrum of the Fourier transform of the distortion function, thereby to produce an intermediate signal which is now Fourier transformed to recover the optical image having a substantially reduced degree of distortion.

BRIEF DESCRIPTION OF THE DRAWINGS

The sole FIGURE of the drawing is FIG. 1 which illustrates the preferred embodiment of the invention.

DETAILED DESCRIPTION OF PREFERRED EMBODIMENTS OF THE INVENTION

Figure 1:
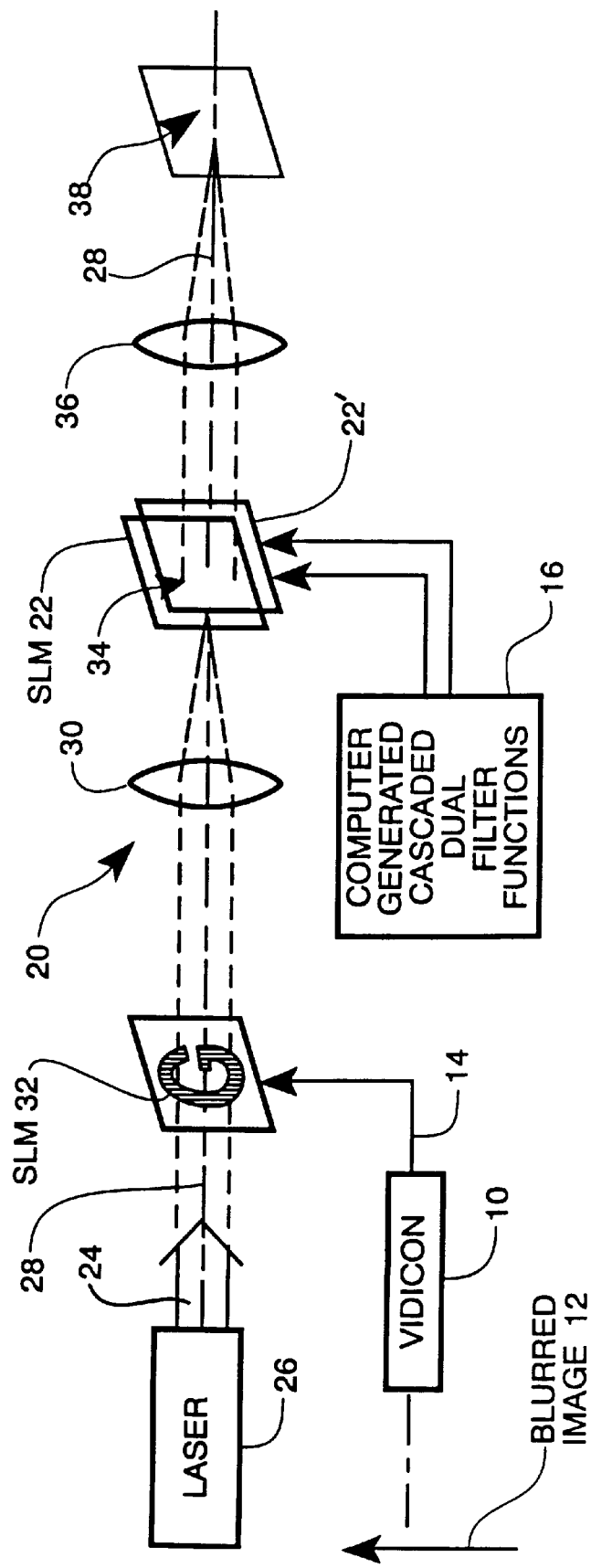

Let us assume that we have an image f(x,y) that is distorted in an optical system where the point spread function of the optical system is given by h(x,y). Then the output of the optical system g(x,y) is given by (1)

$$g(x,y)=f(x,y)*h(x,y) \quad (1)$$

where * denotes the convolution. In order to recover f(x,y) from g(x,y), one has to perform division in the Fourier plane between the Fourier transform of g(x,y) and the Fourier transform of h(x,y), and then to inverse Fourier transform the output. This process can be presented in this form.

$$f(x, y) = FT\left[\frac{G(v_x, v_y)}{H(v_x, v_y)}\right] \quad (2)$$

As we mentioned previously, division in the Fourier transform plane is very difficult to achieve optically either by using photographic optical techniques or by using nonlinear techniques due to the limitation in the required dynamic range of photographic films or nonlinear materials. Therefore, we employ some pseudo deconvolution techniques for image recovery. In these techniques, we replace the exact phase information of $H(v_x,v_y)$ by its (1)binary phase, (2)ternary phase or (3) binary amplitude encoded filters. These forms of phase information coding techniques can be easily addressed with the current existing spatial light modulators. Meanwhile, the amplitude of $H(v_x,v_y)$ is replaced by the square root of the statistical distribution of the power spectra.

Apparatus for practicing the invention is shown in FIG. 1. A conventional frequency plane Fourier transform correlator 20 is provided, along with an image sensor such as vidicon 10, which captures a blurred moving image 12 and inserts the image into a spatial light modulator (SLM) 32. Image 12 could also be, for example, an image viewed by a microscope having an insufficient depth of focus, which produces a defocused image. Laser 26 illuminates SLM 32 with a coherent light beam 24 and Fourier transform lens 30 produces the Fourier transform of the wavefront distorted blurred optical image upon SLM 22 and SLM 22', both positioned at the Fourier plane 34. SLM 22 receives a phase encoded filter generated by computer 16 and SLM 22' receives and displays an amplitude encoded filter generated by computer 16 having a transmittance function which is statistically similar to the reciprocal spatial frequency spectrum of the Fourier transform of the distortion function. This amplitude encoded filter can have a transmissivity which increases along radial lines extending from a central portion of the filter and such transmissivity could be proportional to a $1/f^\alpha$ envelope, where f is the spatial frequency and alpha is a number greater than zero. The change in transmissivity could be different in the x and y directions extending from the center of the filter ie: the transmissivity could increase as a function of $f_x^\alpha * f_y^\beta$, where $f_x$ is the spatial frequency in the x direction and $f_y$ is the spatial frequency in the y direction and where $\alpha$ and $\beta$ are numbers greater than zero. The resulting intermediate signal is again Fourier transformed by transform lens 36 and the output image is projected upon output plane 38 via beam 28. Alternatively, one SLM could be adapted to display both filters.

The pseudo deconvolution performed by the image deconvolution apparatus of FIG. 1 can be understood as follows: let us take the binary phase only filter of $H(v_x,v_y)$ as an example. The binary phase only filter can be expanded into its fundamental phase only information terms as follows:

$$g_{BPOF} = \left(\frac{2}{\pi}\right)\exp^{[-i\phi(\alpha,\beta)]} + \left(\frac{2}{\pi}\right)\exp^{[i\phi(\alpha,\beta)]} + \sum (-1)^{\frac{n-1}{2}}\left(\frac{2}{\pi}n\right)[\exp^{[-in\phi(\alpha,\beta)]} + \exp^{[in\phi(\alpha,\beta)]}] \quad (3)$$

It is clear from Eq. (3) that the binary phase only information in its first order expansion includes the exact phase information and it's conjugate. Therefore, filtering the Fourier transform of the blurred image by the binary phase only information should correct the phase blur in the first order approximation. Thus, the exact phase portion of the reciprocal Fourier transform of the distortion function has been replaced.

In the previous work of Mary Flavin and Joseph Horner they proved that the phase is the important part for image reconstruction. See "Average Amplitude Matched Filter", Opt. Eng. 29, 31–36 (1990). They demonstrated a reconstructed image by using binary phase information of that image accompanied by the amplitude information of a series of unrelated images. Following their approach, we replace the amplitude of $H(v_x,v_y)$ by filters which have the statistical distribution of its power spectrum. See Cottrel et al., Opt. Letts. 13, 336–338, (1988). This approach allows the reconstructed image to have the same approximate gray scale levels as the original image. The technique which we introduce here is similar to an image coding technique used by Cottrel et al. However, we are not aware of any previous work that used phase coding technique for image deconvolution.

Our filters were coded according to the following algorithms. binary phase-only-filter, 1 if $0<\theta<\pi$
−1 if $-\pi<\theta<0$
For the binary amplitude coded filter,
1 if $0<\theta<\pi$
0 if $-\pi<\theta<0$
For the ternary filter,
1 if $1+\cos\phi \geq 1.5$
    else 0 if $\sin\phi \geq 0$
    else −1 if $\sin\phi < 0$ In summary, we have demonstrated that the inverse filter can be replaced by cascading the phase coded filter with an amplitude filter whose amplitude distribution is similar to that of the inverse filter.

Since other embodiments of the invention will occur to those skilled in the art, the scope of the invention is to be defined solely by the language of the following claims and art recognized equivalents thereof.

What is claimed is:

1. A pseudo deconvolving method for recovering an optical image, which has been distorted by its convolution with a distortion function, by the convolution of the Fourier transformed distorted image with a filter approximating the reciprocal of the Fourier transformed distortion function comprising the steps of:

(a) producing a Fourier transform of a wavefront distorted optical image at a Fourier transform plane;

(b) approximating the exact phase portion of the reciprocal Fourier transform of the distortion function with a phase encoded filter having the form selected from the group consisting essentially of a binary phase coded filter, a ternary phase coded filter, and an amplitude coded filter having a shifted distortion function;

(c) providing said phase encoded filter at said Fourier transform plane;

(d) approximating the amplitude portion of the reciprocal Fourier transform of the distortion function with an amplitude encoded filter having a transmittance function which is statistically similar to the reciprocal spatial frequency spectrum of the Fourier transform of the distortion function;

(e) providing said amplitude encoded filter at said Fourier transform plane to produce an intermediate signal at the Fourier transform plane; and (f) Fourier transforming said intermediate signal in order to recover the optical image having a substantially reduced degree of distortion.

2. A pseudo deconvolving apparatus for recovering an optical image, which has been distorted by its convolution with a distortion function, by the convolution of the Fourier transformed distorted image with a filter approximating the reciprocal of the Fourier transformed distortion function comprising:

(a) means for producing a Fourier transform of a wavefront distorted optical image at a Fourier transform plane;

(b) computer means for approximating the exact phase portion of the reciprocal Fourier transform of the distortion function with a phase encoded filter having the form selected from the group consisting essentially of a binary phase coded filter, a ternary phase coded filter, and an amplitude coded filter having a shifted distortion function and for providing said phase encoded filter at said Fourier transform plane;

(c) computer means for approximating the amplitude portion of the reciprocal Fourier transform of the distortion function with an amplitude encoded filter having a transmittance function which is statistically similar to the reciprocal spatial frequency spectrum of the Fourier transform of the distortion function and for providing said amplitude encoded filter at said Fourier transform plane to produce an intermediate signal at the Fourier transform plane; and (d) means for Fourier transforming said intermediate signal in order to recover the optical image having a substantially reduced degree of distortion.

3. Apparatus of claim 2 wherein said amplitude encoded filter has a transmissivity which increases along radial lines extending from a central portion of said amplitude encoded filter.

4. The apparatus of claim 3 wherein said transmissivity increases as a function of $f_x^{\alpha} * f_y^{\beta}$, where $f_x$ is the spatial frequency in the x direction and $f_y$, is the spatial frequency in the y direction, and where $\alpha$ and $\beta$ are numbers greater than zero.

5. A pseudo deconvolving apparatus for recovering an optical image, which has been distorted by its convolution with a distortion function, by the convolution of the Fourier transformed distorted image with a filter approximating the reciprocal of the Fourier transformed distortion function comprising (a) means for producing a Fourier transform of a wavefront distorted optical image at a Fourier transform plane;

(b) computer means for approximating the exact phase portion of the reciprocal Fourier transform of the distortion function with a non-continuous phase encoded filter and for providing said non-continuous phase encoded filter at said Fourier transform plane;

(c) computer means for approximating the amplitude portion of the reciprocal Fourier transform of the distortion function with an amplitude encoded filter having a transmittance function which is statistically similar to the reciprocal spatial frequency spectrum of the Fourier transform of the distortion function and for providing said amplitude encoded filter at said Fourier transform plane to produce an intermediate signal at the Fourier transform plane; and (d) means for Fourier transforming said intermediate signal in order to recover the optical image having a substantially reduced degree of distortion, wherein said amplitude encoded filter has a transmissivity which increases along radial lines extending from a central portion of said amplitude encoded filter.

6. The apparatus of claim 5 wherein said transmissivity increases as a function of $f_x^{\alpha} * f_y^{\beta}$, where $f_x$ is the spatial frequency in the x direction and $f_y$, is the spatial frequency in the y direction, and where $\alpha$ and $\beta$ are numbers greater than zero.

7. A pseudo deconvolving apparatus for recovering an optical image, which has been distorted by its convolution with a distortion function, by the convolution of the Fourier transformed distorted image with a filter approximating the reciprocal of the Fourier transformed distortion function comprising:

(a) means for producing a Fourier transform of a wavefront distorted optical image at a Fourier transform plane;

(b) computer means for approximating the exact phase portion of the reciprocal Fourier transform of the distortion function with a phase encoded filter and for providing said phase encoded filter at said Fourier transform plane;

(c) computer means for approximating the amplitude portion of the reciprocal Fourier transform of the distortion function with an amplitude encoded filter having a transmittance function which is statistically similar to the reciprocal spatial frequency spectrum of the Fourier transform of the distortion function and for providing said amplitude encoded filter at said Fourier transform plane to produce an intermediate signal at the Fourier transform plane;

(d) means for Fourier transforming said intermediate signal in order to recover the optical image having a substantially reduced degree of distortion; and (e) wherein said amplitude encoded filter has a transmissivity which increases along radial lines extending from a central portion of said amplitude encoded filter.

* * * * *